(12) United States Patent
Turner

(10) Patent No.: US 7,467,784 B2
(45) Date of Patent: Dec. 23, 2008

(54) EQUIPMENT COVER LIFTING DEVICE

(76) Inventor: Layton Turner, 4249 Randall Dr., Hamilton, OH (US) 45011

( * ) Notice: Subject to any disclaimer, the term of this patent is extended or adjusted under 35 U.S.C. 154(b) by 0 days.

(21) Appl. No.: 11/805,192

(22) Filed: May 22, 2007

(65) Prior Publication Data

US 2007/0267614 A1 Nov. 22, 2007

Related U.S. Application Data

(60) Provisional application No. 60/802,444, filed on May 22, 2006.

(51) Int. Cl.
*B66D 3/08* (2006.01)
(52) U.S. Cl. ............... 254/394; 296/136.07; 296/136.1; 296/136.13; 135/90
(58) Field of Classification Search ................ 254/393, 254/394, 395, 338; 135/90; 296/136.01, 296/136.07, 136.1, 136.13
See application file for complete search history.

(56) References Cited

U.S. PATENT DOCUMENTS

| 1,759,628 | A | * | 5/1930 | Pellegrino ..................... 135/90 |
| 1,801,247 | A | * | 4/1931 | Hunter et al. ................. 135/90 |
| 2,679,254 | A | * | 5/1954 | Green ..................... 135/88.05 |
| 4,487,212 | A | * | 12/1984 | Moore .......................... 135/90 |
| 4,817,654 | A | * | 4/1989 | Christensen ................. 135/90 |
| 4,830,427 | A | * | 5/1989 | Fiocchi .................... 296/136.1 |
| 5,044,132 | A | * | 9/1991 | Harman ........................ 52/66 |
| 5,086,799 | A | * | 2/1992 | Lumbleau .................... 135/90 |
| 5,269,332 | A | * | 12/1993 | Osborne ................. 135/88.01 |
| 5,769,105 | A | * | 6/1998 | Margol et al. ................. 135/90 |
| 6,386,515 | B1 | * | 5/2002 | Sachtleben .................. 254/338 |

* cited by examiner

*Primary Examiner*—Emmanuel M Marcelo
(74) *Attorney, Agent, or Firm*—James Ray & Assoc.

(57) ABSTRACT

A device for lifting and lowering a cover from a lower surface of a roof includes four lines connected to the ends of a top panel of the cover. The lines pass through eyes on the cover at the midsection of the top panel, then through pulleys on the lower surface of the roof, then to a cleat on a wall. Pulling the lines lifts the cover off the vehicle.

9 Claims, 4 Drawing Sheets

EQUIPMENT COVER LIFTING DEVICE

The applicant claims priority from his provisional application filed May 22, 2006 and assigned Ser. No. 60/802,444. The present application relates to covers for automobiles, boats, equipment and the like and for a device for removing, storing, and repositioning such covers.

BACKGROUND OF THE INVENTION

Covers are provided to protect equipment such as automobiles, boats, motorcycles and all terrain vehicles from exposure to the environment. Classic equipment owners, automobile collectors and boat owners frequently wish to cover their prize vehicles with a cloth cover even when the vehicle is stored in the garage to prevent dents, dings, scratches, and the collection of dirt and the like which accumulates within a storage facility. When the automobile collector, classic car or boat owner desires to use his protected vehicle he must remove the equipment cover before the vehicle can be used, and after use, reinstall the cover. Such equipment covers are generally made of a canvas or durable plastic that is heavy such that the cover is difficult to maneuver during installation and removal. When such a cover is left in a parking location while the vehicle is in use, the cover can be an awkward obstruction when the vehicle is to be returned to its assigned parking stall.

It would be desirable, therefore, to provide a device for removal of an equipment cover and for the reinstallation of the equipment cover to a vehicle that is returned to its parking stall, and to store the cover where it will not interfere with the movement of the vehicle when the cover is not in use.

SUMMARY OF THE INVENTION

Briefly, the present invention is embodied in a device attachable to the lower surface of the roof of a garage for lifting and lowering a cover for a vehicle or other equipment where the equipment cover has a forward end, a rearward panel, generally parallel spaced apart side panels, and a top panel. The top panel itself has a forward section, a midsection, and a rearward section, with the midsection being generally rectangular defined by four points that generally correspond to the corners of the rectangle.

In accordance with the invention, a loop or eye is attached to the equipment cover at each of the four points that define the corners of the midsection of the top panel of the cover. A first line is attached to the cover at the forward section of the top adjacent a first of the side panels and at a position generally near the forward end of the cover. A second line is attached to the cover near the intersection of the forward section of the top and the second side panel toward the forward end of the cover, and a third line is attached to the cover at an intersection of the rearward panel, the rearward section of the top panel, and the first of the side panels. Finally, a fourth line is attached to the cover at an intersection of the rearward panel, the rearward portion of the top panel and the second side panel. Four pulleys are attached to the inner surface of the garage, with one pulley positioned above each of the four points that define the rectangular midsection of the top panel of the cover while the cover is stretched over the vehicle and the vehicle is in its assigned parking position. Finally, each of the four lines is threaded through one of the loops, or eyes, attached to the four points defining the midsection of the central panel with each line passing through the nearest of the loops and then extending to the pulley directly overhead with the ends of the lines removably attachable to a cleat or peg on the wall of the garage.

When it is desirable to remove an equipment cover with lines, loops and pulleys as described above from a vehicle, one need only pull on the four lines. As the lines are pulled, the forward and rearward ends of the equipment cover will be drawn toward the midsection of the top panel and thereafter the midsection of the top panel, and the forward and rearward ends will all be drawn upwardly to a position immediately below the ceiling or rafters of the garage. The lines can then be tied around the cleat to retain the cover in its elevated position after which the vehicle can be removed from its assigned parking position for use. When the vehicle is returned to its parking position, the lines are disconnected from the cleat thereby allowing the cover to fall across the mid portion of the vehicle. Thereafter, the owner will manually pull the forward end of the cover around the forward end of the vehicle and the rearward end of cover around the rearward end of the vehicle to recover the vehicle.

In the preferred embodiment, an elongate generally rigid spacer extends between the first and second lines to thereby maintain the first side of the equipment cover separate from the second side thereof as the cover is being removed and reinstalled over the vehicle. In like manner, a second spacer is positioned between the third and fourth lines to maintain separation of these lines and therefore the separation of the sides of the cover near the rearward end of the vehicle. Also, in the preferred embodiment, the lines are removably attachable to the various portions of the cover to which they are attached by, lightweight quick release connectors or the like so that the cover can be easily disconnected from the lines.

BRIEF DESCRIPTION OF THE DRAWINGS

A better understanding of the invention will be had after a reading of the following detailed description taken in conjunction with the drawings wherein.

DETAILED DESCRIPTION OF PREFERRED EMBODIMENT

Figure 1:
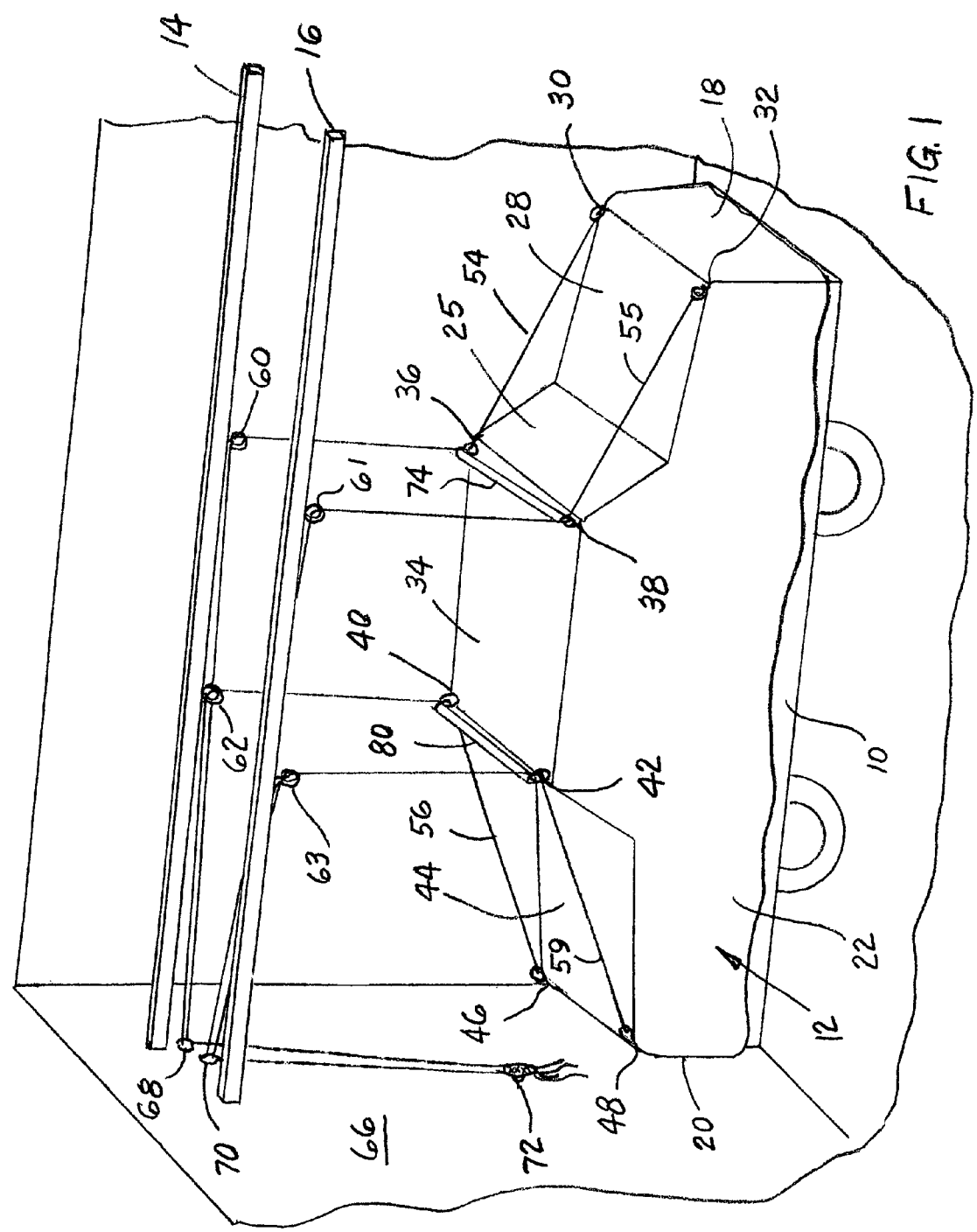
FIG. 1 is an isometric view of a vehicle covered by an equipment cover connected to the inner supports of a garage roof in accordance with the invention.
Figure 2:
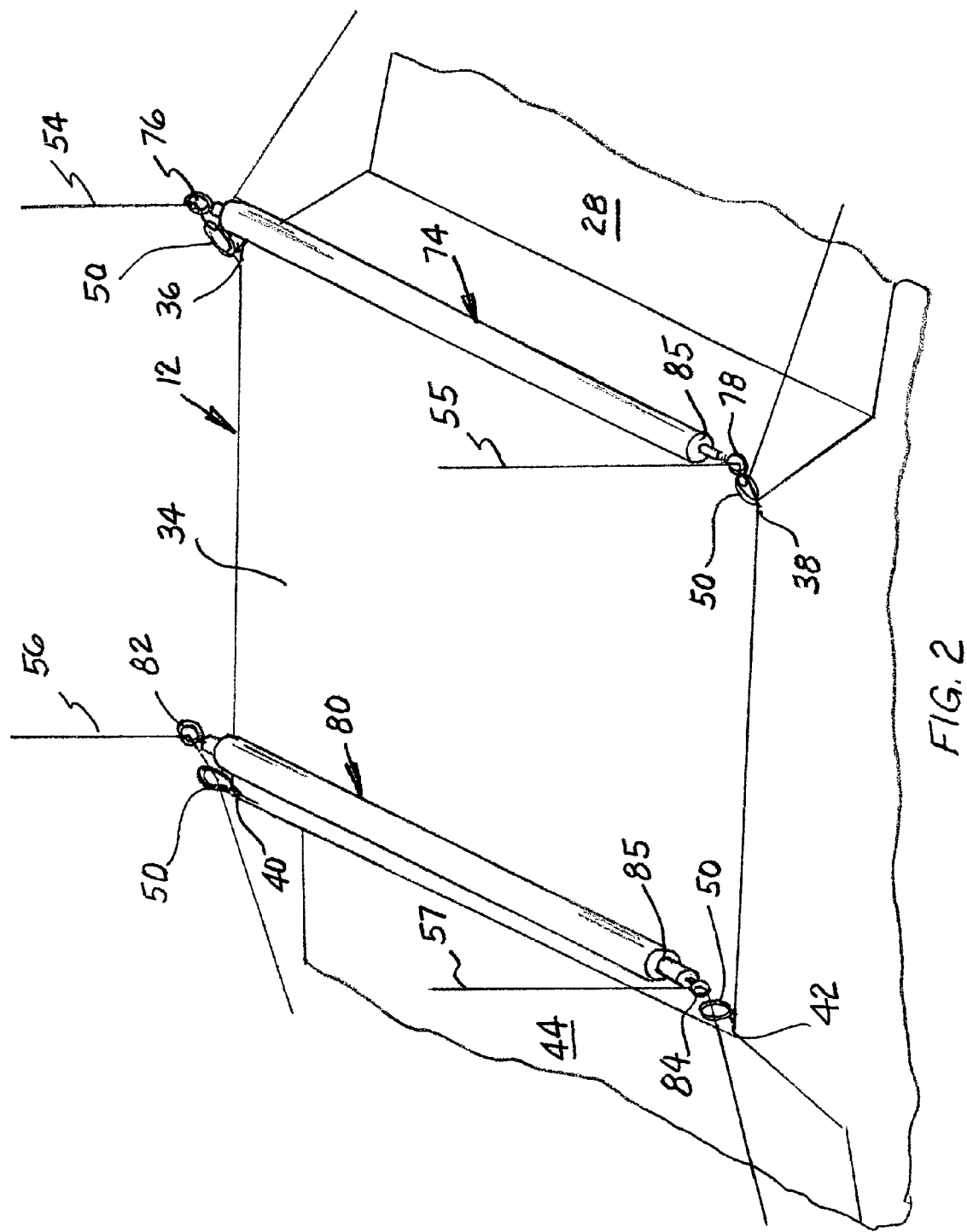
FIG. 2 is a fragmentary enlarged isometric view of the spacers and their attachment to the lines as shown in FIG. 1.

Referring to FIGS. 1 and 2, equipment 10, such as an automobile, boat, motorcycle, all terrain vehicle, or other equipment only portions of which are visible, is covered by a cover 12 as it sits in a garage having horizontal overhead structural supports 14, 16 that provide strength to the ceiling or roof, not shown. While the structural supports 14 and 16 are shown, there are other well know ceiling support elements available such as lumber fastened to the ceiling as reinforcement. While structural supports 14 and 16 are used as an example, any ceiling support may be used.

The cover 12 generally conforms to the exterior shape of the equipment 10 and includes a forward panel 18, a rearward panel 20, generally parallel opposing side panels, one of which 22 is visible, and a top panel 26. The top panel 26 is in turn divided into a generally rectangular forward section 28 having a front left corner 30 and a front right corner 32, a generally rectangular midsection 34 having left and right forward corners 36, 38 respectively that also demark the left and right rearward corners of the forward section 28, and left and right rearward corners 40, 42. Rearward of the midsection 34 is a rearward section 44 having rearward left and right corners 46, 48 and having left and right forward corners 40, 42 which duplicate the rearward corners of the midsection 34. The cover 12 is preferably made of a heavy plastic material or a heavy fabric, such as canvas, so as to protect the vehicle from becoming scratched or dinged as a result of minor impacts as it is stored within the enclosure of the garage.

Figures 3, 4:
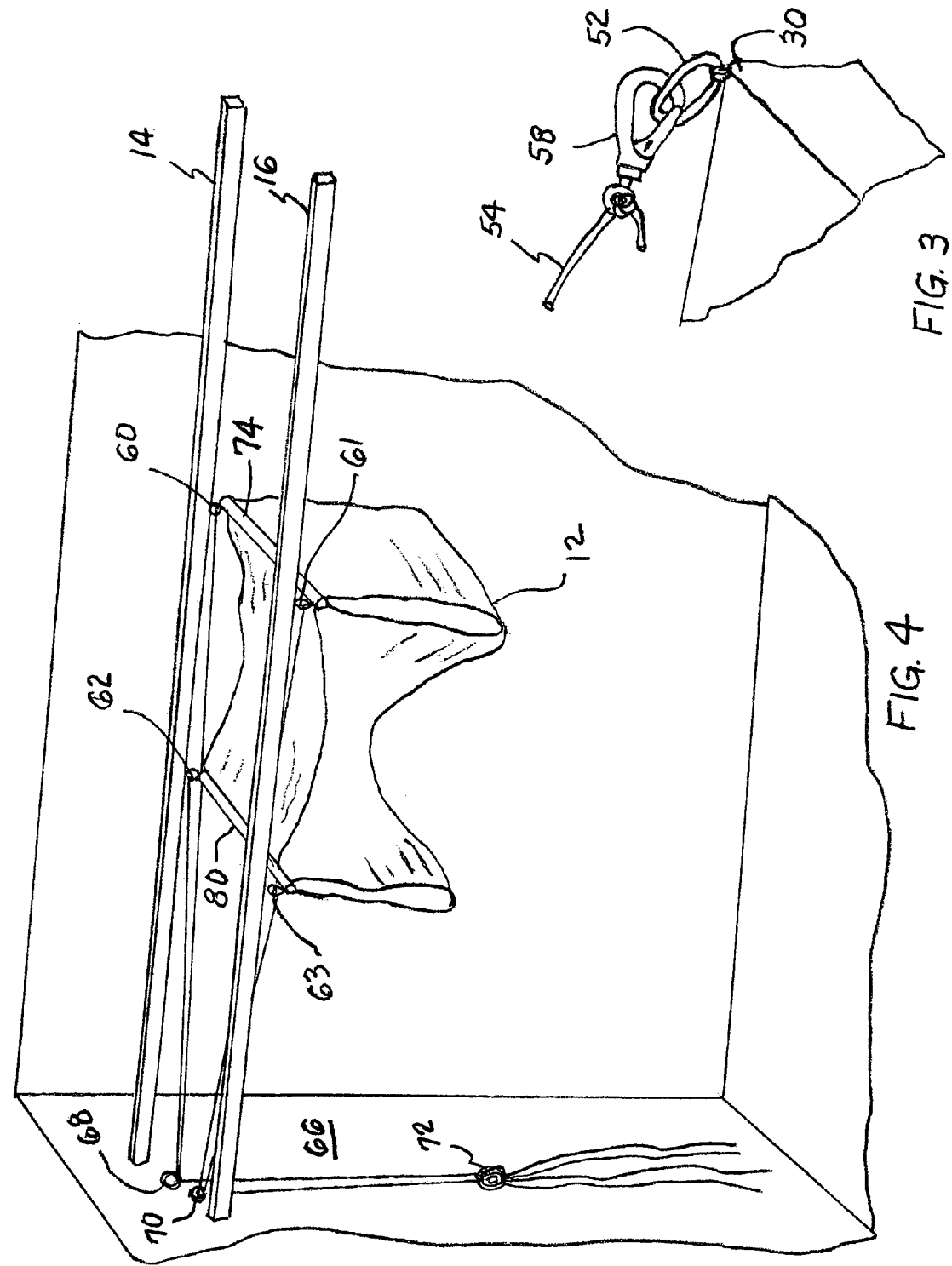
FIG. 3 is an enlarged isometric view of a portion of the cover shown in FIG. 1 having a loop attached thereto and a line connected to the loop by a quick release connector.
FIG. 4 is an isometric view of the equipment cover and equipment shown in FIG. 1 with the cover withdrawn and suspended from the ceiling.

Referring to FIGS. 1, 2 and 3, attached to each of the four corners 36, 38, 40, 42 of the midsection 34 of the cover 12 is loop 50. Preferably, the loops 50 are made of a sturdy flexible material such as a nylon strap or the like. The loops 50 are of a predetermined length; preferably the strap length is 10 inches forming a five inch loop. As shown in FIG. 2, each of the forward corners 30, 32 of the forward section 28 and each of the rearward corners 46, 48 of the rearward section 44 also have attached thereto a flexible loop, one of which 52 attached to corner 30 is depicted in FIG. 3.

Attached to each of the four outer corners 30, 32, 46, 48 of the top panel 26 are flexible lines 54, 55, 56, 57 respectively of which the attachment of only line 54 is shown in detail in FIG. 3. Each of the lines 54-57 is attached to its corresponding loop 52 by a quick release connector 58 such that each of the lines 54-57 is easily disconnected from the respective corner loop 30, 32, 46, 48 to which it is attached. Quick release connectors 58 are larger than eyes 76, 78, 82 and 84.

Roof supports 15, 16 are attached to the under side of the ceiling of the enclosing garage. Four pulleys 60, 61, 62, 63, each of which is attached to roof supports 15, 16 that extend over the top of equipment 10 and over the four corners 36, 38, 40, 42 of the midsection 34. On a wall 66 of the enclosing garage generally at the elevation of the supports 14, 16 and generally adjacent one end or side of the equipment 10 are a pair of double pulleys 68, 70, and below the double pulleys 68, 70 and securely attached to the wall 66 is a cleat 72. The hardware, such as threaded eye hooks to attach said pulleys 60-63, 68 and 70 is generally known and not shown on the figures.

Figure 5:
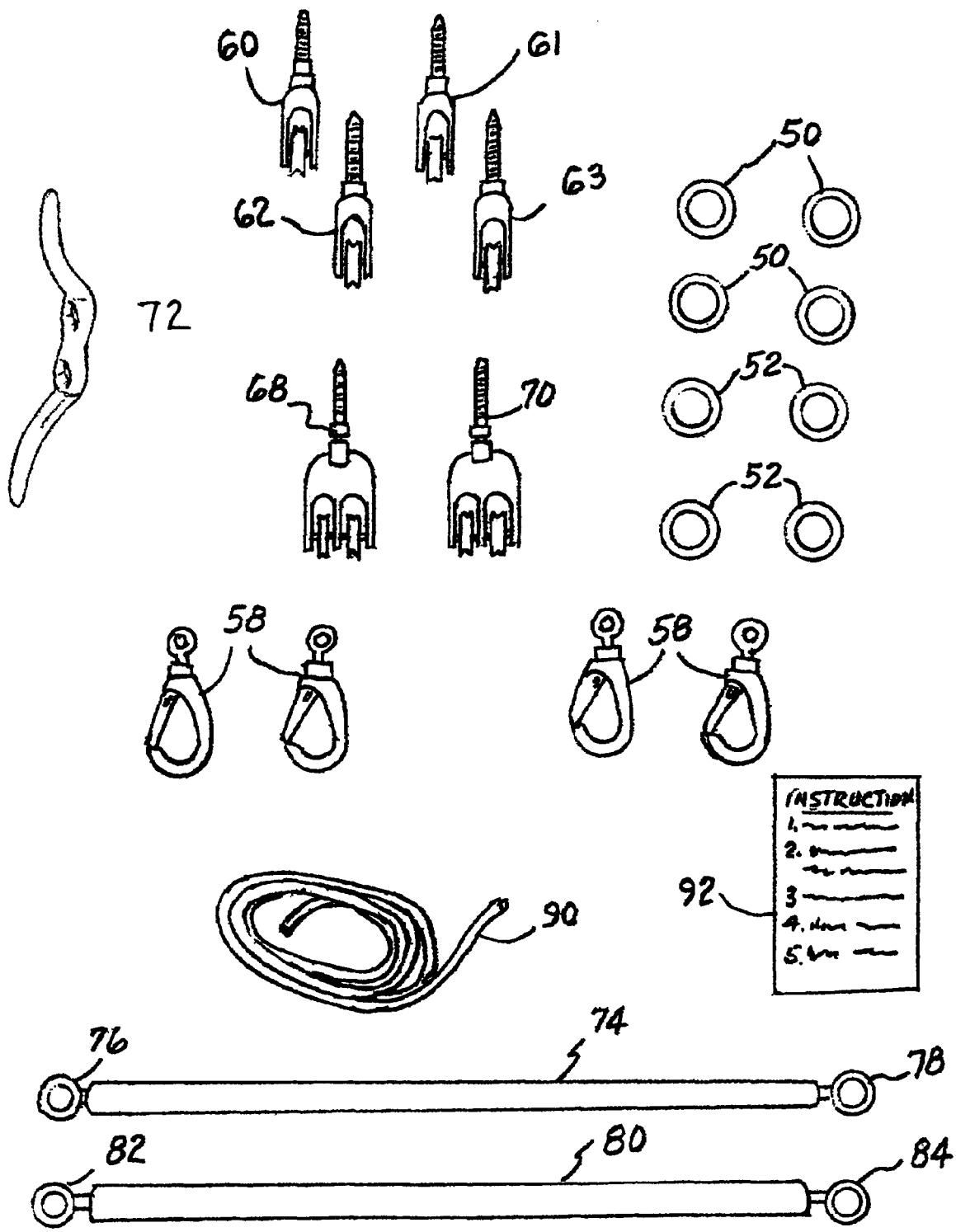
FIG. 5 is a schematic drawing showing the elements of a kit for attaching the invention to an equipment cover.

Referring to FIGS. 2 and 5, extending between the left and right forward corners 36, 38 of the midsection 34 is an elongate rigid spacer 74 having a left eye 76 and a right eye 78 each of which has a diameter suitable large to allow one of the lines 54-57 to easily slide there through. Similarly, between the right and left rear corners 40, 42 of the midsection 34 is a second spacer 80 having left and right eyes 82, 84 suitable large in diameter to allow one of the lines 54-57 to slide there through. To protect the equipment 10 from being scratched by one of spacers 74, 80, the spacers 74, 80 are wrapped in a sleeve 85 made of foam or rubber.

In accordance with the invention, line 54 has one end attached by quick release connector 58 and loop 52 to corner 30 of the cover 12, and the length thereof extends through a loop 50 at the corner 36 of the midsection 34, then through eye 76 of spacer 74, then through pulley 60 attached to support 14, then to double pulley 68 and to cleat 72. Line 55 is connected by a quick release connector 58 to a loop 52 at the front right corner 32 and extends through a loop 50 attached to the right corner 38 of the midsection 34 then through the second eye 78 of spacer 74, then to pulley 61 attached to support 16, then double pulley 70 with the end tied to the cleat 72. The third line 56 has one end attached by quick release connector 58 to a loop 52 attached to the left rearward corner 46 of the cover 12, and the length thereof extending through loop 50 attached to the left rearward corner 40 of the midsection 34 then through eye 82 of spacer 80, then through pulley 62 attached to support 14, then through double pulley 68 with the opposite end tied to the cleat 72. Finally, the fourth line 57 has one end attached by a quick release connector 58 to the loop 52 of the rearward right corner 48 of the cover 12, the length thereof extending through loop 50 of the right rear corner 42 of the midsection 34, then through the second eye 84 of the spacer 80, then through the pulley 63 attached to the support 16, then through second pulley 70 with the second end attached to the cleat 72.

Referring to FIGS. 1 and 4, to remove the cover 12 from the equipment 10 the lines 54-57 are disconnected from the cleat 72 and are drawn more or less evenly causing the forward corners 30, 32 to be drawn towards the forward corners 36, 38 of the midsection 34 and the rearward corners 46, 48 to be drawn to the rearward corners 40, 42 of midsection 34. As the lines 54-57 are continued to be pulled, the entire cover 12 will be lifted to a position immediately adjacent the supports 14, 16 as shown in FIG. 4. Thereafter, the equipment 10 can be removed from its parking place and placed in use. When the equipment 10 is returned to its parking place, the lines 54-57 can be disconnected from the cleat 72 thereby allowing the cover 12 to drop down on the upper surface of the roof of the equipment 10. Thereafter, the operator can manually grasp the forward end of the cover 12 and draw the forward panel 18 across the forward end of the equipment 10 and in similar fashion draw the rearward panel 20 across the rearward end of the vehicle thereby recovering the vehicle. The ends of the lines 54-57 are preferably reattached to the cleat 72 to keep the lines from becoming tangled or from sliding out of their respective pulleys.

Referring to FIG. 5, the invention is marketable as an after market kit that includes at least four loops 50 for attachment to the cover at the corners of the midsection, a length of line 90, and four pulleys 60-63 plus a set of instructions 92 instructing the purchaser to assemble the parts as described above. In a more complex form, the kit may include four more loops 52 for attachment to the outer corners of the cover, two double pulleys 68, 70, two spacers 74, 80, four quick release connectors 58 and cleat 72. The invention may also be marketed by the manufacturer of an equipment cover, in which case the various loops are attached to the equipment cover by the manufacturer.

While the invention has been described with respect to a single embodiment, it will be appreciated that many modifications and variations can be made without departing from the spirit and scope of the invention. It is therefore the intent of the appended claims to cover all such modifications and variations that fall within the true spirit and scope of the invention.

What is claimed:

1. In a garage with a ceiling, walls, an upper portion generally adjacent to such ceiling, device for lifting and lowering a cover from such upper portion of such garage, such cover having a forward panel, a rearward panel, generally parallel opposing spaced apart first and second side panels and a top panel, said top panel having a forward section, a midsection, and a rearward section, said midsection being generally rectangular and defined by four points generally corresponding to corners of said rectangle, said device comprising:

a loop attached at each of said four points of said midsection;

a first line attached to said cover at an intersection of said forward panel, said forward section of said top, and a first of said side panels, a second line attached to said cover at an intersection of said forward panel, said forward section of said top and a second of said side panels, a third line attached to said cover at an intersection of said rearward panel, said rearward section and said first of said side panels, a fourth line attached to said cover at an intersection of said rearward panel, said rearward section and said second of said side panels, a first, a second, a third, and a fourth pulley attached to said lower surface of such roof, said first line extending through a first of said loops and through said first pulley, said second line extending through a second of said loops and through said second pulley, said third line extending through a third of said loops and through said third pulley, and said fourth line extending through a fourth of said loops and through said fourth pulley.

2. The device of claim 1 and further comprising a first spacer between said first line and said second line and a second spacer third line and said fourth line, said spacers having an eyelet at each end to receive said line, said spacers each disposed on an axis substantially parallel to said forward panel and said rearward panel and at an elevation generally at or above said loops.

3. A devise of claim 1 further comprising a first and second double pulley attached to said upper portion of said garage, where said lines 1 and 2 received from said first pulley and said second pulley and said second double pulley receiving lines from said third and fourth pulleys, said first and said second double pulleys are located between said first, second third and fourth pulleys and such wall of such garage generally adjacent to such vehicle, and a means to attach said first, second, third and fourth lines to such wall.

4. The device of claim 1 wherein said lines are attached to said cover by quick release connectors between said lines and said cover.

5. An equipment cover comprising a body, said body including a forward panel, a rearward panel, parallel spaced apart side panels, and a top panel, said top panel having a forward section, a midsection and a rearward section, said midsection being generally rectangular and defined by four points generally corresponding to corners of said rectangle, each of said four points of said midsection having a loop attached thereto, a first line attached to said cover at an intersection of said forward panel, said forward section of said top, and a first of said side panels, a second line attached to said cover at an intersection of said forward panel, said forward section of said top and a second of said side panels, a third line attached to said cover at an intersection of said rearward panel, said rearward section and said first of said side panels, and a fourth line attached to said cover at an intersection of said rearward panel, said rearward section and said second of said side panels.

6. The equipment cover of claim 5 wherein said lines are connected to said cover by quick release connectors between said lines and said cover.

7. A kit for raising and lowering a equipment cover from a lower surface of a roof of a garage to cover a vehicle wherein said equipment cover has a forward panel, a rearward panel, opposing substantially parallel spaced apart side panels and a top panel, said top panel having a forward section, a midsection, and a rearward section, said midsection being generally rectangular and definable by four points generally corresponding to corners of said midsection rectangle, said kit comprising:

at least 4 loops,
a predetermined length of flexible line,
at least four single pulleys, and
set of instructions instructing that four lengths of line are to be attached to said cover.

8. A kit for raising and lowering a equipment cover from a lower surface of a roof of a garage to cover a vehicle wherein said equipment cover has a forward panel, a rearward panel, opposing substantially parallel spaced apart side panels and a top panel, said top panel having a forward section, a midsection, and a rearward section, said midsection being generally rectangular and definable by four points generally corresponding to corners of said midsection rectangle, said kit comprising:

at least 4 loops,
a predetermined length of flexible line;
at least four single pulleys,
set of instructions instructing that four lengths of line are to be attached to said cover,
a first line attached to said cover at an intersection of said forward panel, said forward section of said top and a first of said side panels,
a second line attached to said cover at an intersection of said forward panel, said forward section of said top and a second of said side panels,
a third line attached to said cover at an intersection of said rearward panel, said rearward section and said first of said side panels,
a fourth line attached to said cover at an intersection of said rearward panel, said rearward section and said second of said side panels, and
said four loops are attached near said four points of said midsection,
said pulleys attached to such upper portion of such garage with each of said lines to extend through one of said loops and one of said pulleys.

9. A kit of claim 8 further comprising:
two double pulleys;
said number of loops is 8 loops;
two spacers and
a cleat.

* * * * *